(12) United States Patent
Holland

(10) Patent No.: X9509
(45) Date of Patent: Mar. 18, 1836

(54) LEAD, WHITE

(76) Inventor: Homer Holland

Homer Holland.

Letters Patent.

The schedule referred to in these Letters Patent and making
part of the same, containing a description in the words of the
said Homer Holland himself of his improvement in the process of
oxidizing Metallic leads and making carbonate of lead.

To all to whom these presents shall come; Be it known that
I, Homer Holland of the Town of Westfield, County of Hampden
and State of Massachusetts, have invented a new and useful
improvement in the process for oxidizing Metalic Lead & for
making & producing carbonate of lead or the Pigment commonly
known by the name of white lead, which improvement has
not heretofore been known or used & that the following is a
full and exact description of said improvement, sufficiently
distinguish the same from all things before known to enable
any person skilled in the art or science of making & producing
the salts, acetate & nitrate of lead, from any oxyde or the
carbonate of lead to apply & use said improvement in the
making & compounding of the same. The invention consists:
1st In an improvement in the method of applying the conjoint
action of friction, air and water to metalic, by placing
fragments of this metal in revolving lead cylinders or
chambers; so as to produce a fine powder or pulpy
suboxide of lead, for making or producing the [illegible]
salts, Nitrate & acetate of lead.
2nd In combining carbonic acid, from the atmosphere, directly
with this suboxide, as it is formed in the cylinder by the
addition of carbonate of soda or other alkaline carbonates
so as to produce or make the carbonate of lead or the
Pigment known as white lead. To effect the oxidation
of of the lead, I put coarse shot or other fragments of unalloyed
lead, into a leaden cylinder or chamber, about four feet in length
and three feet in diameter, made to revolve, horizontally upon
an axis of flanges. The leaden cylinder or chamber is enclosed
in a strong and tight wooden case. Air is admitted by perfo-
rations of the cylinder at its ends, near the axis. Soft water
is put in the chamber, sufficient to cover the charge of shot
or fragments. The cylinder is made to revolve eighteen or
twenty times in a minute, by the application of any force
& the electro-chemical action of the friction air & water,
produces a fine pulpy suboxide of lead which is drained
out by removing a bung from the side of the cylinder & placing
therein a hollow tube, leading to a sieve or strainer resting
in a canal or trough, which conduct to a reservoir.

This pulpy suboxide sufficiently freed from water, is
readily combined with acetic acid, and giving "sugar of
lead" and with nitric acid producing nitrate of lead.

To make carbonate of lead the process is identical with
the above described for the suboxide;— with the addition
about six or eight ounces of the carbonate of soda to each
gallon of water used in the cylinder. The cylinder is revolved
several hours in producing the suboxide for the salts of lead
and from twelve to sixteen, previous to straining out the
carbonate or white lead; which is conducted as above described
to a vessel, armed with agitator & washed by decantation with
pure water, once or twice, to free it from alkali. When it is to be
dried by any convenient means, becoming the pure carbonate or
"known" white lead of commerce. In this process for white lead, the use
of vinegar & of acetic or acetous acid in any shape, is avoided & the
health of the manufacturers is preserved from the fumes of the
volatile pyroacetate [?] of lead so deadly in the ordinary process
The foregoing process I prefer; but the revolving chambers may be
cylindrical, square or polygonal, of any size & length. The lead lining [catchword]

lining of a wooden cylinder may be of sheet lead or cast in a
cylinder to fit the wooden case or [illegible] & are to be renewed from
time to time as they [illegible] away - The number of cylinders their weight
and the charge, will depend on the force employed and the extent
of the manufacture - Each cylinder (principally the lead chambers) [illegible]
may weigh six hundred pounds - The charge added from one hundred
to one hundred & fifty pounds fragments & the necessary water and
carbonate of soda - The lead fragments may be shreds of sheet lead,
shot or fragments, produced by pouring melted lead through a [illegible]
into water. Antimony and other alloys of metals are often min-
gled with lead in the shot of commerce & unfit them for this purpose
The alkali preferred is soda, as this has the strongest affinity or
attraction for oxygen & carbonic acid & is less liable to form an
hydrate - The pulpy suboxide may also be conveniently carbonated
in the vessel employed for decantation, as it is armed with an
agitator; by passing into the pulpy suboxide, as withdrawn from
cylinders, carbonic acid produced by combustion of charcoal,
from fermentation or from the decomposition of carbonate of
lime or chalk, by sulphuric or hydrochloric acid. The decanting
vessel, again may be used conveniently in removing a disa-
greeable yellowness of pure carbonated lead, by minutely
mingling of a trifle of indigo or blue smalts with the carbonate
of lead. I claim as my invention & improvement.
1st The application of the revolving cylinders or chambers as
above described, to the filling, comminution, amalgamation
or converting of metallic lead into the fine pulpy suboxide of
lead, for the salts, acetate & nitrate of lead - or carbonate of lead.
2nd The carbonating of the above described suboxide while
formed in the cylinder by the addition of an alkaline carbonate
or by passing into this pulp directly, carbonic acid, giving imme-
diately white lead. -

Witnesses
Wm Hooker Jr
Chester Woodworth

Homer Holland (Patented 18 March 1823)